United States Patent [19]
Parent et al.

[11] Patent Number: 5,917,145
[45] Date of Patent: Jun. 29, 1999

[54] METHOD AND APPARATUS FOR MEASUREMENT OF TEMPERATURES OF MOLTEN ALUMINUM AND ALUMINUM ALLOYS

[75] Inventors: Luc Parent, Chicoutimi; Sylvain P. Tremblay, Jonquiere, both of Canada

[73] Assignee: Alcan International Limited, Montreal, Canada

[21] Appl. No.: 08/816,318

[22] Filed: Mar. 13, 1997

Related U.S. Application Data

[60] Provisional application No. 60/013,422, Mar. 14, 1996.

[51] Int. Cl.⁶ .............................. H01L 35/02; G01K 1/12
[52] U.S. Cl. ............................................. 136/234; 374/140
[58] Field of Search ........................... 136/234; 374/179, 374/140

[56] References Cited

U.S. PATENT DOCUMENTS

| | | | |
|---|---|---|---|
| 2,019,695 | 11/1935 | Ross | 374/140 |
| 2,384,024 | 9/1945 | Goller | 136/234 |
| 3,357,250 | 12/1967 | Lowdermilk | 374/140 |
| 3,463,005 | 8/1969 | Hance | 374/140 |
| 3,643,509 | 2/1972 | Surinx | 374/140 |
| 3,647,558 | 3/1972 | McMurtry . | |
| 3,816,183 | 6/1974 | Kraus . | |
| 3,942,242 | 3/1976 | Rizzolo . | |
| 4,060,095 | 11/1977 | Kurita | 136/234 |
| 4,216,028 | 8/1980 | Kurita | 136/234 |
| 4,358,630 | 11/1982 | Falk . | |
| 4,377,347 | 3/1983 | Hanmyo et al. . | |
| 4,430,518 | 2/1984 | Nakajima et al. | 136/234 |
| 4,749,416 | 6/1988 | Greenspan | 374/140 |
| 4,984,904 | 1/1991 | Nakano et al. | 374/140 |
| 5,071,258 | 12/1991 | Usher et al. . | |
| 5,180,228 | 1/1993 | Tarumi et al. | 374/140 |
| 5,197,805 | 3/1993 | Wilson | 374/140 |
| 5,360,269 | 11/1994 | Ogawa et al. . | |
| 5,709,474 | 1/1998 | Richardson et al. | 374/140 |

FOREIGN PATENT DOCUMENTS

| | | | |
|---|---|---|---|
| 3-15729 | 1/1991 | Japan | 374/139 |
| 6-323919 | 11/1994 | Japan . | |
| 1173203 | 8/1985 | Russian Federation . | |
| 7910 | 6/1908 | United Kingdom | 374/140 |
| WO 90/09682 | 8/1990 | WIPO . | |

*Primary Examiner*—Harshad Patel
*Assistant Examiner*—Robin C. Clark
*Attorney, Agent, or Firm*—Cooper & Dunham LLP

[57] ABSTRACT

Apparatus for and a method of measuring the temperature of molten aluminum or aluminum alloys. The apparatus comprises a temperature measuring device, usually a thermocouple, contained within a protective tubular sheath, the sheath enclosing the temperature measuring device at least to a point above the point of maximum immersion in molten aluminum during use of the apparatus. The sheath comprises at least one inner layer closed at one end, and an outer layer, the outer layer being made of steel or cast iron, and the inner layer being made of a continuous refractory material. The outer layer and the at least one inner layer are free of discontinuous (refractory) refractory materials between them. The continuous refractory material may be, for example, a carbon fiber-reinforced carbon or graphite fiber-reinforced calcium silicate refractory, and is resistant to failure in, i.e. penetration by, molten aluminum or aluminum alloy. The apparatus is long-lived and durable and does not contaminate the molten metal when it fails.

32 Claims, 2 Drawing Sheets

METHOD AND APPARATUS FOR MEASUREMENT OF TEMPERATURES OF MOLTEN ALUMINUM AND ALUMINUM ALLOYS

CROSS-REFERENCE TO RELATED APPLICATION

This application is a continuation of applicants' U.S. provisional patent application Ser. No. 60/013,422, filed Mar. 14, 1996.

BACKGROUND OF THE INVENTION

I. Field of the Invention

This invention relates to the measurement of temperatures in molten aluminum and aluminum alloys. More particularly, the invention relates to a method and apparatus for protecting temperature measuring devices, such as thermocouple devices, from molten aluminum and aluminum alloys, and to protected temperature measuring devices suitable for immersion into molten aluminum and aluminum alloys.

II. Discussion of the Prior Art

In processes and equipment for handling molten aluminum and aluminum alloys, metal temperatures must frequently be measured. This is needed, for example, in metal melting furnaces, in-line degassers, filter boxes, and other equipment associated with metal holding and casting operations.

These applications require the use of measuring devices, normally thermocouple devices, that are not only protected from attack by molten aluminum and aluminum alloys for the desired period of measurement, but that are also protected from mechanical damage in the plant prior to installation in the equipment, and that are also protected from the high thermal shock that occurs when the devices are inserted directly into molten aluminum (a sudden temperature change of up to 700° C. can occur upon such insertion). A fast temperature response is also highly desirable.

Frequently, temperature is measured using a thermocouple device positioned inside a larger steel or cast iron tube, coated with a metal-resistant coating or wash as a protective layer. Such devices offer good response time, but once the protective layer fails, either through mishandling in the plant, or by abrasion within the molten metal vessel, the steel or cast iron tube rapidly fails, and the thermocouple fails shortly thereafter. Such devices are inexpensive, but the requirement for frequent replacement offsets the low unit cost.

Some alternative metals may be considered for the protective tube, but almost all common metals dissolve in molten aluminum and aluminum alloys and experience premature tube failure. Thermocouple devices themselves have been constructed using a metal outer sheath and inner refractory powder layer to protect the thermocouple element. Such devices are described, for example, in U.S. Pat. No. 3,942,242 (Rizzolo). However, once the metal outer sheath fails, the powder cannot prevent metal penetration to the measuring element, and furthermore, the powder is released to contaminate the molten metal. In addition, the extensive use of powder insulation reduces the thermal response of the device.

Thermocouple assemblies have also been constructed with metal outer sheaths and solid refractory or ceramic inner sheaths. A device of this kind is described in U.S. Pat. No. 5,071,258 (John D. Usher et al.). However, the refractory or ceramic is chosen for strength and toughness rather than thermal shock resistance, and therefore tends to crack on insertion into molten aluminum or aluminum alloy. Furthermore, many refractories are reactive with molten aluminum and its alloys; therefore, once the metal outer sheath fails, the inner layer does not provide protection and the entire assembly fails. When such assemblies fail, the refractory pieces are heavier than the molten aluminum or alloy and are not easily removed. In vessels such as in-line degassers, the refractory fragments can damage rotary injectors during subsequent operations.

Thermocouple assemblies intended for short term use have also been constructed with an end cap that is designed to fail but that provides temporary protection for the tip of the assembly when the assembly is passed through dross or flux present at the metal surface. Such a device is disclosed, for example, in U.S. Pat. No. 4,358,630 (Richard A. Falk). However, such devices are designed to be removed from the molten metal after a short period of time (and then refurbished with a new protector cap). Disadvantageously, the protector cap does not offer protection from general mechanical damage, nor from mechanical damage elsewhere than at the tip of the device.

Accordingly there is a need for an inexpensive, thermal shock resistant, temperature measuring device, particularly a thermocouple assembly, offering good mechanical protection prior to use, long term protection from molten aluminum and aluminum alloys when in use, good thermal response, and ease of cleanup when the assembly eventually fails.

SUMMARY OF THE INVENTION

An object of the present invention is to provide protection for temperature measuring devices, such as thermocouple devices, intended for prolonged use in measuring the temperatures of molten aluminum and its alloys.

Another object of the invention is to provide a temperature measuring apparatus that is resistant to damage during handling and installation prior to the intended use.

Yet another object of the invention is to protect temperature measuring devices for use in molten metals without unduly affecting the temperature responsiveness of the temperature measuring elements.

Yet another object of the invention is to provide a temperature measuring apparatus that is resistant to the thermal shock involved when the apparatus is immersed into molten aluminum or aluminum alloy.

Still another object of the invention is to provide a temperature measuring apparatus that, upon failure in molten aluminum or aluminum alloy, creates debris that can be removed from the molten metal without undue difficulty.

According to one aspect of the invention, there is provided an apparatus for measuring temperature in molten aluminum or aluminum alloys. The apparatus comprises a temperature measurement device contained within a protective tubular sheath, the sheath enclosing the temperature measurement device at least to a point above a point of maximum immersion in molten aluminum or alloy during use of the apparatus, and the sheath comprising at least one inner layer closed at one end and an outer layer. The outer layer is made of steel or cast iron, and the inner layer, or each inner layer when there is more than one, is made of a continuous refractory material that is resistant to penetration by molten aluminum or aluminum alloys and that is resistant to failure caused by thermal shock when the apparatus is inserted into molten aluminum or aluminum alloy. The apparatus is free of discontinuous (particulate) refractory material between the outer metal layer and the inner layer, or the outermost one of the inner layers when there is more than one.

While the metal layer is referred to as an "outer" layer, it may of course itself be coated with one or more layers or washes of refractory materials, as in conventional devices, but this is not essential for enhancing the protection time of this invention.

According to another aspect of the invention, there is provided a protective tubular sheath for use in protecting temperature measuring devices used for measuring temperatures of molten aluminum or aluminum alloys. The sheath comprises an outer layer made of steel or cast iron, and at least one inner layer closed at one end, for receiving a temperature measuring device therein, made of a continuous refractory material that is resistant to penetration by molten aluminum or aluminum alloy and that is resistant to failure caused by thermal shock when the sheath is inserted into molten aluminum or aluminum alloy. The sheath is free of discontinuous (particulate) refractory material between the outer layer and the inner layer, or the outermost inner layer when there is more than one such inner layer, i.e. the outer layer and the outermost inner layer have no discontinuous (particulate) material provided between them.

Again, as noted above, the outermost metal layer may itself be coated with one or more refractory layers.

According to yet another aspect of the invention, there is provided a method of measuring temperatures in molten aluminum or aluminum alloys. The method makes use of a temperature measuring apparatus including a temperature measuring device that produces an output corresponding to detected temperatures, and a protective tubular sheath. The protective tubular sheath extends at least above a point of immersion of the apparatus in molten aluminum or aluminum alloy during use. The sheath comprises at least one inner layer closed at one end and an outer layer, the outer layer being made of steel or cast iron, the at least one inner layer being made of a refractory material that is resistant to penetration by molten aluminum or aluminum alloy and that is resistant to failure caused by thermal shock when the apparatus is inserted into molten aluminum alloy. The sheath is free of discontinuous refractory material between the outer layer and the inner refractory layer, or at least an outer one of several inner refractory layers. The apparatus is inserted into the molten aluminum or aluminum alloy and output from the apparatus is detected and used to determine the temperature of the molten aluminum or aluminum alloy. The apparatus is retained in the molten aluminum or alloy at least until the outer metal layer has partially dissolved in the molten aluminum or alloy.

The method of measuring temperature preferably further includes the steps of retaining the apparatus in the molten aluminum or aluminum alloy until the continuous refractory material fails, and then removing the residue of the refractory material from the surface of the molten aluminum.

In the present invention, the temperature measuring device is preferably a thermocouple device, but may be any other temperature measuring device suitable for measuring the temperature of molten aluminum or aluminum alloy.

The temperature measuring device may be a thermocouple element (e.g., chromel-alumel type) but more frequently consists of a thermocouple element sealed within a metallic sheath and electrically insulated from the metallic sheath by a refractory powder (e.g., MgO).

The various layers of the protective sheath may have any cross-sectional shape (e.g. square, oval, octagonal, etc.), but are preferably circular in cross-section, ideally forming coaxial, closed-ended, mutually telescoped tubes.

The outer layer may be closed at one end (the end adjacent to the closed end of the at least one inner layer) or may be open at that end, provided that the sides of the inner layer are surrounded by the outer layer at least to the closed end of the inner layer.

Two or more inner layers of continuous refractory material may be provided, if desired, instead of just one, in which case the regions between the two or more layers are preferably, but not necessarily, also free of discontinuous material. The important factor is that the region between the outermost continuous refractory layer and the metal tube be free of discontinuous material. Preferably, for the sake of simplicity, economy and ease of manufacture, there is just a single continuous refractory layer provided between the metal tube and the temperature measuring device. The refractory and metal tubes are generally not bonded together or otherwise joined along their length.

The continuous refractory material is preferably a refractory material that has a resistance to molten aluminum or aluminum alloy for at least 100 hours, and most preferably for at least 200 hours. The term "resistance to molten aluminum" used herein in connection with the refractory layer(s) of the sheath means that a sample of refractory of the shape and size and number of layers that would be used in the present device will not be penetrated by molten aluminum, when exposed to molten aluminum or aluminum alloy at a temperature of 700 to 750° C. in a stirred vessel, for the period of time indicated.

The continuous refractory material is preferably a refractory having a bulk density of less than the density of the molten aluminum or alloy, and most preferably less than 2.0 g/cm$^3$. The term "bulk density" means the density of a piece of material including any porosity (open or closed) that is not accessible to molten aluminum or alloy under normal conditions of use. This means porosity that is excluded by virtue of the non-wettable characteristics (by molten aluminum or alloy) of certain refractory materials. Materials having a bulk density less than molten aluminum, and preferably less than 2.0 c/cm$^3$, float on the surface of the molten aluminum or aluminum alloy when temperature measuring assemblies containing such materials eventually fail.

The continuous refractory material is preferably a refractory having a thermal shock resistance of at least 200° C., and more preferably at least 600° C. Preferably, the material is a fibre-reinforced refractory material, for example, carbon fibre-reinforced carbon, and graphite fibre-reinforced calcium silicate refractory. These reinforced materials have a degree of shock resistance that permits them to be used in the present invention, while also exhibiting adequate resistance to attack by molten aluminum and alloys.

The inner refractory layer, or each such layer when there is more than one, is preferably made as a single piece, but may be assembled from several pieces joined together (for example by gluing), provided the several pieces when joined together have substantially the same thermomechanical and corrosion resistance properties as a layer made of a single piece of the same material.

The inner refractory layer, or one or more of such layers when there is more than one, may if desired be cast in place by any suitable casting means for refractory materials.

The thickness of the inner layer, or the total of the thicknesses of all such layers when there is more than one, is preferably between 4 and 20 mm. Other thicknesses may be suitable, but if the layer(s) is (are) made too thin, the layer(s) will not resist the molten metal adequately. If too thick, the thermal response of the temperature measuring device will suffer and thermal shock may be more likely to cause damage (since such damage may be related to the geometry of the layer(s), at least to some extent).

The thickness of the outer metal tube is not particularly critical, although weight becomes a problem if the metal is made too thick, and damage during shipping and handling may occur if the metal is too thin. In practice, the metal is preferably at least 3 mm thick, with no definite upper limit. The apparatus of the present invention overcomes the problems associated with the prior art apparatus and methods and is relatively inexpensive. It permits a thermocouple assembly to be used in molten aluminum or aluminum alloy for extended periods of time (e.g., up to four weeks) before failure and, on failure, preferably permits the residual parts to be easily and quickly removed from the metal surface to avoid contaminating the metal. The apparatus also exhibits resistance to mechanical damage prior to and after insertion into the molten metal.

In operation the apparatus is designed to be partially sacrificial. The metal outer layer provides mechanical protection prior to insertion into the molten metal. The inner refractory layer(s) provide protection from the molten metal for predictable amounts of time, even though the insertion process subjects the assembly to a rapid temperature rise from ambient to about 700° C. in typical installations.

In the present invention, there are no intervening layers of discontinuous (particulate) material (such as refractory powders) positioned between the outer metal tube and the inner continuous refractory layer (or the outermost one of several such layers). Moreover, there are preferably no such discontinuous layer(s) provided between the continuous refractory layers themselves when two or more such layers are present, since the presence of such layers would increase the thermal response time and could produce widely dispersed debris in the molten metal upon failure. The region between the outer metal tube and the inner refractory layer, and between the inner layers when multiple inner layers are present, may be an empty space formed, for example, by the insertion of one tube of smaller dimensions into the interior of a second tube of larger dimensions. However, this region may be devoid of any free space at all if, for example, the refractory inner layer is cast within the tubular outer metal layer. The important consideration is to avoid the use of discontinuous (particulate) material within the device, at least outside the refractory layer (or at least the final one of several such layers) that provide protection against the penetration of metal through to the temperature measuring device itself. Normally, however, a free space is provided between each of the layers because the apparatus can be produced most easily and economically by creating tubular layers of decreasing external and internal diameters and then assembling the tubular layers one within another, with the temperature measuring device positioned within the innermost layer.

As already noted, the inner refractory layer or layers experience a rapid temperature rise and must have good thermal shock resistance to prevent cracking of the continuous refractory material. Thermal shock resistance of refractories is determined in several ways, but because of the rapid temperature rise and relatively thin material used, the thermal shock resistance measured in °C., is the most appropriate measure of such an effect. This quantity corresponds to the temperature change required to cause fracture as described for example in R. Morrell, Handbook of Properties of Technical & Engineering Ceramics, Part 1, Section 2.6.2.2 and can be calculated in terms of the thermal and mechanical properties of material by the formula:

$$R = \frac{\sigma_s(1-\nu)}{E\alpha}$$

wherein:
$\sigma_s$=Surface fracture stress
$\nu$=Poisson ratio
E=Modulus
$\alpha$=Coefficient of thermal expansion.

The thermal shock resistance can also be determined empirically by plunging a sample of material in the geometric form of the inner layer of this invention into a bath so as to cause a rapid temperature rise. The type of bath required is one which causes a rapid heat transfer to the sample. In a practical manner, a sample at room temperature can be plunged into molten aluminum and if the material does not fracture under those conditions, its thermal shock resistance exceeds about 600° C.

The outer metal tube eventually perforates, at least partially, because of contact with the molten metal, but remains protective at and above the surface of the molten metal where solid dross or debris may be present. Because the inner material does not crack, and is resistant to penetration by molten aluminum or aluminum alloy, very substantial improvements in the operational life of the assembly may be achieved.

When the inner layer does eventually fail, in a preferred embodiment, the material is less dense than the molten aluminum or alloy, and the pieces float to the surface where they can easily be removed.

While there are a number of material combinations that meet all of the stated requirements at the same time, it has been found that fibre reinforced refractories (fibres such as SiC or carbon being commonly available) and in particular carbon fibre-reinforced carbon composites and graphite fibre-reinforced calcium silicate refractories are particularly suitable. The latter provides for an assembly that is inexpensive to manufacture and therefore cost effective in use. One example of the latter material is N-17™ refractory material sold by Pyrotek International Inc.

It is believed that such materials have a high surface fracture stress which contributes to the thermal shock resistance. Alternatively a low thermal expansion coefficient will also contribute to meeting this thermal shock requirement. Materials that are not fibre reinforced but have thermal expansion coefficients of less or equal to about $1\times10^{-6}$/°C. would be expected to be suitable materials for consideration, provided the resistance to molten aluminum and its alloys was sufficiently high, and preferably, the bulk density was low enough.

Other materials may be used which have the necessary properties of aluminum resistance, thermal shock resistance and preferably density as outlined above where these properties may be determined by the methods described above.

The invention is suitable for use with aluminum and all aluminum alloys, even highly reactive Al—Mg alloys, since materials for the inner layer(s) that resist such molten alloys adequately can be provided, e.g. the graphite-reinforced calcium silicate materials mentioned above.

DETAILED DESCRIPTION OF THE PREFERRED EMBODIMENTS

Figure 1:
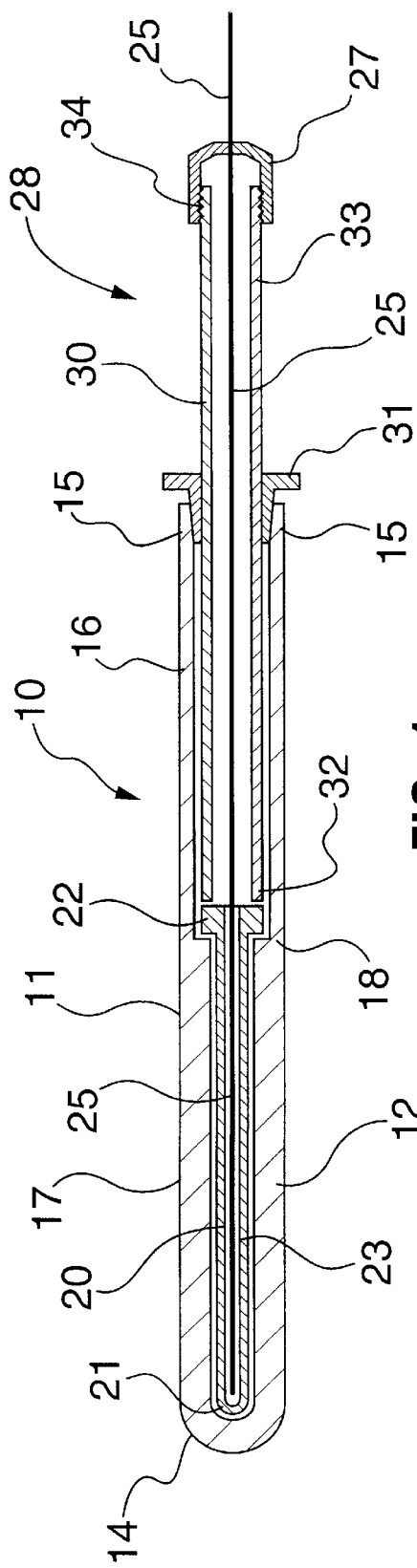
FIG. 1 is a cross-sectional view of a preferred embodiment of a protective sheath assembly according to the present invention.

FIG. 1 shows a vertical section through a preferred thermocouple apparatus 10 according to the present invention including a protective sheath 11. The sheath 11 consists of a tube 12 of cast iron or steel, sealed at one end 14, and with an internally threaded joint 15 at the opposite (open) end. Within the interior of the tube 12, the diameter of the internal bore in the upper portion 16 (the portion adjacent to the open end) is enlarged relative to the internal bore of the lower portion 17 (the portion adjacent to the closed end), and an abrupt internal step 18 is produced where the internal bores meet each other. If desired, the tube may be externally coated with a layer (not shown) of an aluminum-resistant coating, for example, a baked-on water glass. The tube 12 is sufficiently long that, in use, the upper end of the tube lies above the metal level.

A further tube 20 made of refractory material is positioned inside the metal tube 10, and is closed at one end 21 and provided with a shoulder 22 at the other (open) end, fabricated so that the tube 20 fits inside the metal tube 12 with the shoulder 22 resting on the step 18. There is generally a narrow region between the outer tube 10 and the inner tube 20, and this is normally kept free of insertions. In particular, there is no discontinuous (particulate) refractory material provided in this region in order to avoid such material escaping into the molten metal when the outer tube 10 is perforated. In fact, if the tubes 10 and 20 can be made to suitable tolerances, the region between these tubes can virtually eliminated.

The length of the tube 20 is such that the closed end 21 rests just clear of the interior of the closed end 14 of the tube 12 when assembled within the tube 12. The refractory tube 20 has an interior passage 23 of sufficient diameter that a standard metal-sheathed thermocouple device 25 will fit inside without binding.

The shoulder 22 is positioned within the tube 12 such that when the device is immersed in molten aluminum or aluminum alloy, the shoulder will always lie above the surface of the molten metal.

The refractory used for tube 20 may be any refractory meeting the requirements indicated above. It is preferred in this particular embodiment that the refractory be machineable. Carbon-reinforced carbon composites or graphite-reinforced calcium silicate refractories, such as N-17™ refractory material sold by Pyrotek International Inc., of Spokane, Wash., USA, are suitable. The material sold as N-17™ is described in a product brochure from Pyrotek entitled "N-17 REFRACTORY BOARD" (the disclosure of which is incorporated herein by reference), and has the following composition by weight:

| | |
|---|---|
| $SiO_2$ | 49.4% |
| CaO | 43.5% |
| $Al_2O_3$ | 0.3% |
| $Fe_2O_3$ | 0.3% |

It is a graphite fiber-reinforced, high purity, calcium silicate board of high strength, low shrinkage and resistance to thermal shock. Its density is about 801 kg/m$^3$, its maximum operating temperature is about 850° C., and its coefficient of thermal expansion is about $7 \times 10^{-6}$/°C.

In other embodiments, refractories preformed to the desired shape by slip casting or similar forming may avoid the need for machining, and other refractories may then be suitable.

A retaining head 28 made of steel or cast iron is provided to retain the refractory tube 20 loosely within the outer metal tube 12 and to support the thermocouple device 25. The retaining head has body 30 in the form of a tube. A threaded gland 31 fixed to the head, which mates with the interior thread 15 of the tube 12, is positioned such that, when installed, an end 32 of the body 30 lies a short distance from the top of the refractory inner tube 20, thus retaining the inner tube 20 in place without applying stress to it. An upper end 33 of the body 30 is threaded at 34 to permit a mating connector 26 for the thermocouple device 25 to be fixed to the body. The overall length of the retaining head 28 is selected so that the thermocouple device 25, when installed, will be positioned close to interior of the closed end 21 of the refractory inner tube 20 without applying stress to the closed end.

The thermocouple device 25 can be any commonly used device for this type of temperature measurement service. A typical device consists of a thermocouple element (generally with a chromel-alumel or "Type K" junction) embedded in a MgO powder and in turn contained in the stainless steel tube. The powder provides electrical insulation for the thermocouple element. Such a device is for example disclosed in U.S. Pat. No. 3,942,242, the disclosure of which is incorporated herein by reference. The presence of a discontinuous powder (e.g., MgO powder) within such a thermocouple device does not negate the effectiveness of the apparatus of the present invention since the MgO is within the inner refractory tube 20 of the device and therefore is still largely confined on final failure of the tube 20 by aluminum penetration.

Figure 2:
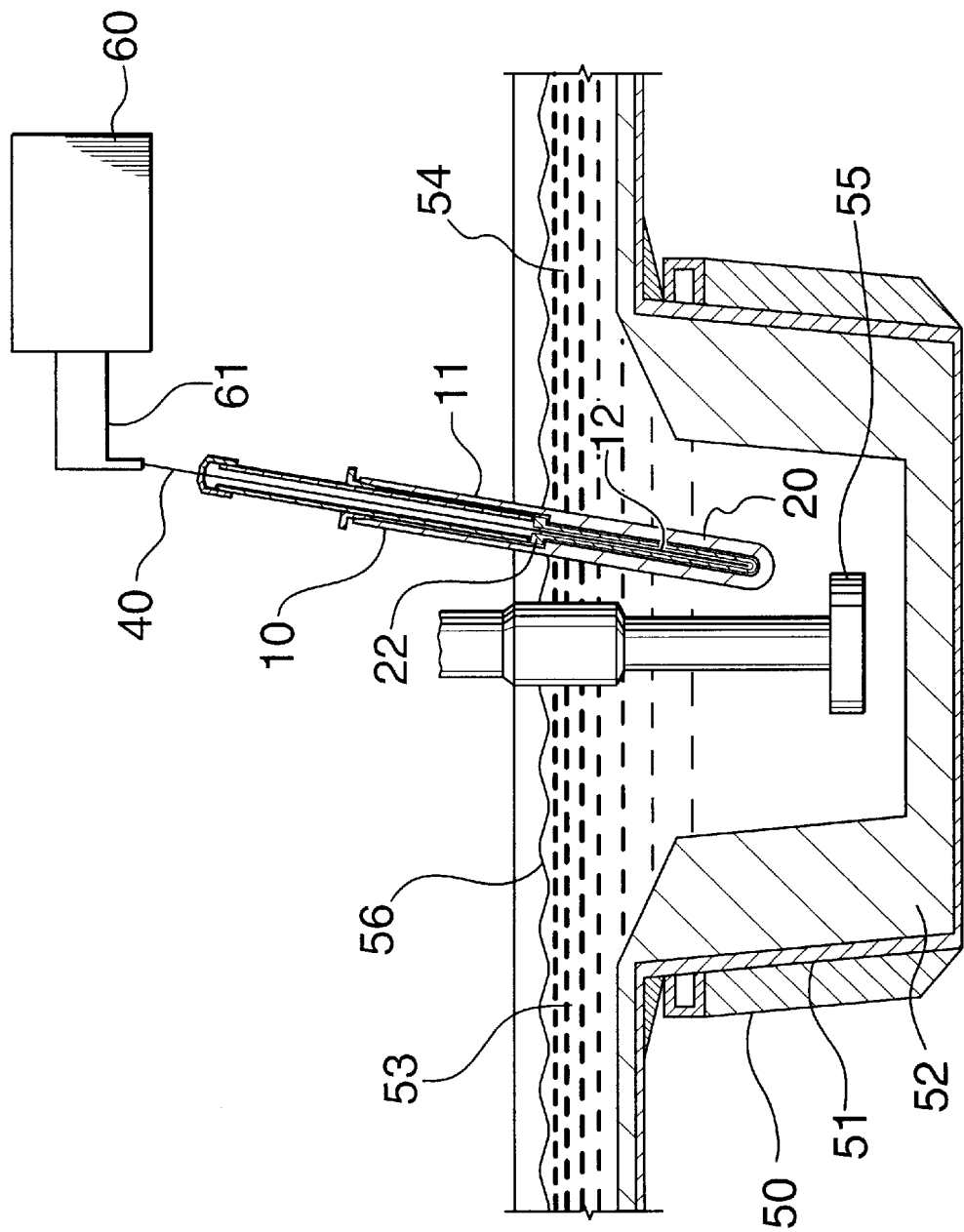
FIG. 2 is a vertical cross section of a typical installation of apparatus of the present invention in an in-line aluminum degasser.

FIG. 2 shows an embodiment of the thermocouple apparatus 10 of the present invention installed within a typical in-line degasser for aluminum and aluminum alloys. The degasser 50 consists of a metal box 51, suitably reinforced and provided with a refractory lining 52. The degasser is attached at an inlet 53 and an outlet 54 to refractory-lined metal delivery troughs. One or more rotary gas injectors 55 are provided to inject gas bubbles into the molten metal to degas the metal. In use, the metal fills the delivery troughs and degasser to a level 56. The thermocouple assembly 10, as described in FIG. 1, including a protective sheath 11, is inserted into the degasser, near a rotary gas injector 55, such that the outer metal tube 12 extends above the metal level 56, and the shoulder 22 of the internal tube 20 lies above the metal level 56 as well.

The thermocouple device 10 is connected by a pair of wires 61 to a readout unit 60. The wires are generally made of the same alloys as the element of the thermocouple device 25. The readout unit consists of the millivolt measuring device and a cold junction compensator. Such readout units are well known in the art.

The readout unit 60 detects signals from the thermocouple device 10 and uses the signals to measure and display the temperature of the molten aluminum or aluminum alloy. The device 10 is generally maintained in the molten metal at least until the outer metal layer has partially dissolved in the molten aluminum or alloy.

The thermocouple assembly 10 is capable of prolonged accurate temperature measurement despite its location within the moving molten metal.

Figure 3:
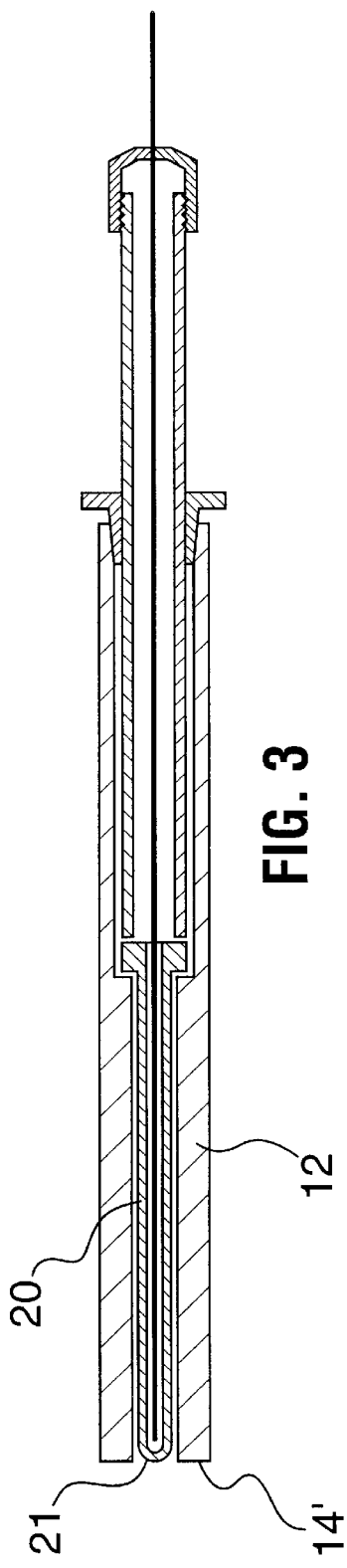
FIG. 3 is a cross-sectional view of a second embodiment of a protective sheath assembly according to the present invention.

FIG. 3 shows a second embodiment of the apparatus which in most respects resembles the apparatus in FIG. 1. However the end 14' of the protective outer metal tube 12 is open. The tube, however, covers the inner layer 20 over its entire length and the end 14' may if desired extend beyond the end of the inner layer 20. Such an assembly provides similar protective capability of the sheath of FIG. 1, but is less expensive to manufacture.

The invention is described in more detail with reference to the following Example, which is not intended to limit the scope of the invention.

EXAMPLE

Thermocouple assemblies as shown in FIG. 1, using a carbon fibre-reinforced carbon composite and fibre-reinforced calcium silicate refractory as the refractory internal tube 20, were prepared and inserted into an in-line degasser of the "Alpur" (Trademark) type. The degasser was used in-line with a furnace and casting machine. The thermocouples failed (indicating metal penetration through the refractory layer) after an average of 504 hours for the carbon fibre-reinforced carbon composite internal tube and an average of 432 hours for the fibre-reinforced calcium silicate refractory internal tube. This was compared to a prior art device which had a similar configuration, except that no refractory tube was present, which had an average lifetime of 96±48 hours.

What we claim is:

1. An apparatus for measuring temperature in molten aluminum or aluminum alloys, comprising:
    a temperature measurement device contained within a protective tubular sheath, said sheath enclosing said temperature measurement device at least to a point above a point of maximum immersion in molten aluminum during use of said apparatus, and said sheath comprising at least one inner layer closed at one end and an outer layer;
    said outer layer being made of a metal selected from the group consisting of steel and cast iron;
    said at least one inner layer being made of a continuous refractory material that has a bulk density less than the density of molten aluminum, that is resistant to penetration by molten aluminum or aluminum alloys and that is resistant to failure caused by thermal shock when said apparatus is inserted into molten aluminum or aluminum alloy; and
    said apparatus being free of discontinuous refractory material between said outer layer and said at least one inner layer.

2. Apparatus according to claim 1 having at least two said inner layers, said apparatus also being free of discontinuous refractory material between said at least two inner layers, as well as between an outermost one of said inner layers and said outer metal layer.

3. Apparatus according to claim 1 wherein said at least one inner layer and said outer layer are both tubular, and wherein said layers are positioned substantially co-axially.

4. Apparatus according to claim 1 wherein said at least one inner layer is resistant to penetration by molten aluminum for at least 100 hours.

5. Apparatus according to claim 1 wherein said at least one inner layer is resistant to penetration by molten aluminum for at least 200 hours.

6. Apparatus according to claim 1 wherein said continuous refractory is a refractory having a bulk density of less than 2.0 g/m$^3$.

7. Apparatus according to claim 1 wherein said continuous refractory material has a thermal shock resistance of at least 200° C.

8. Apparatus according to claim 1 wherein said continuous refractory material has a thermal shock resistance of at least 600° C.

9. Apparatus according to claim 1 wherein said continuous refractory material is a fibre-reinforced refractory.

10. Apparatus according to claim 9 wherein said fibre reinforced-refractory material is selected from the group consisting of carbon fibre-reinforced carbon, and graphite fibre-reinforced calcium silicate refractory.

11. Apparatus according to claim 1 wherein each said at least one inner layer is formed as a single piece.

12. Apparatus according to claim 1 wherein each said at least one inner layer is formed from several pieces joined together.

13. Apparatus according to claim 12 wherein said several pieces are joined together by gluing.

14. Apparatus according to claim 1 wherein at least one of said inner layers is cast in place.

15. Apparatus according to claim 1 wherein said outer layer is closed at one end.

16. A protective tubular sheath for use in protecting temperature measuring devices used for measuring temperatures of molten aluminum or aluminum alloys, comprising:
    an outer layer made of a metal selected from the group consisting of steel and cast iron; and
    at least one inner layer, closed at one end, for receiving a temperature measuring device therein, made of a continuous refractory material that has a bulk density less than the density of molten aluminum, that is resistant to penetration by molten aluminum or aluminum alloy and that is resistant to failure caused by thermal shock when the sheath is inserted into molten aluminum or aluminum alloy;
    said sheath being free of discontinuous refractory material between said outer layer and said at least on inner layer.

17. Apparatus according to claim 16 having at least two said inner layers, said sheath also being free of discontinuous refractory material between said at least two inner layers, as well as between an outermost one of said inner layers and said outer metal layer.

18. A protective sheath according to claim 16 wherein said at least one inner layer and said outer layer are both tubular, and wherein said layers are positioned substantially co-axially.

19. A protective sheath according to claim 16 wherein said at least one inner layer is resistant to molten aluminum or aluminum alloys for at least 100 hours.

20. A protective sheath according to claim 16 wherein said at least one inner layer is resistant to molten aluminum or aluminum alloys for at least 200 hours.

21. A protective sheath according to claim 16 wherein said continuous refractory is a refractory having a bulk density of less than 2.0 g/m$^3$.

22. A protective sheath according to claim 16 wherein said continuous refractory material has a thermal shock resistance of at least 200° C.

23. A protective sheath according to claim 16 wherein said continuous refractory material has a thermal shock resistance of at least 600° C.

24. A protective sheath according to claim 16 wherein said continuous refractory material is a fibre-reinforces refractory.

25. A protective sheath according to claim 24 wherein said fibre-reinforced refractory material is selected from the group consisting of carbon fibre-reinforced carbon, and graphite fibre-reinforced calcium silicate refractory.

26. A protective sheath according to claim 16 wherein each said refractory inner layer is formed as a single piece.

27. A protective sheath according to claim 16 wherein each said refractory inner layer is formed from several pieces joined together.

28. A protective sheath according to claim 27 wherein said several pieces are joined together by gluing.

29. Apparatus according to claim 16 wherein at least one of said inner layers is cast in place.

30. Apparatus according to claim 16 wherein the said outer layer is closed at one end.

31. A method of measuring temperatures in molten aluminum or aluminum alloys, comprising the steps of:

provided a temperature measuring apparatus comprising a temperature measuring device that produces an output corresponding to detected temperatures, and a protective tubular sheath, said protective tubular sheath extending at least above a point of immersion of said apparatus in molten aluminum or aluminum alloy during use, said sheath comprising at least one inner layer closed at one end and an outer layer, said outer layer being made of a metal selected from the group consisting of steel and cast iron, said at least one inner layer being made of a refractory material that has a bulk density less than the density of molten aluminum, that is resistant to penetration by molten aluminum or aluminum alloy and that is resistant to failure caused by thermal shock when the device is inserted into molten aluminum alloy, and said sheath being free of discontinuous refractory materials between said outer layer and said at least one inner layer;

inserting said apparatus rapidly into said molten aluminum or aluminum alloy;

detecting said output from said apparatus and using said output to determine temperatures of said molten aluminum or aluminum alloy; and retaining said apparatus in said molten aluminum at least until the said outer metal layer has partially dissolved in the molten aluminum or alloy.

32. A method according to claim 31, wherein said method further comprising the steps of retaining the apparatus in said molten aluminum or aluminum alloy until said continuous refractory material of said at least one inner layer fails and the refractory material enters the molten metal to form a residue, and then removing the residue from the surface of the molten aluminum.

* * * * *